(12) United States Patent
McClure

(10) Patent No.: US 6,651,408 B1
(45) Date of Patent: Nov. 25, 2003

(54) ADJUSTABLE FORCE NET BRAKE MECHANISM AND WRAPPING MATERIAL DISPENSING ASSEMBLY

(75) Inventor: John R. McClure, New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/198,750

(22) Filed: Jul. 19, 2002

(51) Int. Cl.$^7$ .......................... B65H 23/14; B65H 77/00
(52) U.S. Cl. .............................. 53/587; 53/118; 53/556; 242/421.2
(58) Field of Search ............................ 53/118, 587, 64, 53/389.2, 389.3, 556; 242/421.2, 422.5, 422.4; 188/1.11 R, 1.11 W

(56) References Cited

U.S. PATENT DOCUMENTS

| | | | | |
|---|---|---|---|---|
| 1,822,495 A | * | 9/1931 | Laycock | 242/421.1 |
| 1,875,111 A | | 8/1932 | Nieman | |
| 1,925,580 A | | 9/1933 | Anderson | |
| 2,266,437 A | | 12/1941 | Nelson | |
| 2,479,285 A | | 8/1949 | Williams | |
| 2,963,236 A | * | 12/1960 | Grosser et al. | 242/421.2 |
| 3,669,376 A | * | 6/1972 | Lucas | 242/421.2 |
| 4,008,114 A | * | 2/1977 | Lindsey | 156/392 |
| 4,422,592 A | * | 12/1983 | Swope et al. | 242/421.2 |
| 4,697,402 A | * | 10/1987 | Anstey et al. | 53/506 |
| 5,109,652 A | * | 5/1992 | Viaud et al. | 53/508 |
| 5,152,123 A | * | 10/1992 | Viaud et al. | 53/508 |
| 5,607,121 A | * | 3/1997 | Boriani et al. | 242/563.2 |
| 5,687,548 A | * | 11/1997 | McClure et al. | 53/399 |
| 5,855,109 A | * | 1/1999 | Vande Ryse et al. | 56/341 |
| 6,029,420 A | | 2/2000 | Tertilt et al. | |
| 6,050,052 A | * | 4/2000 | Herron et al. | 53/118 |
| 6,164,050 A | | 12/2000 | Vande Ryse et al. | |
| 6,168,108 B1 | * | 1/2001 | Morley | 242/421.1 |
| 6,240,974 B1 | * | 6/2001 | Hehle | 139/430 |
| 6,536,337 B2 | * | 3/2003 | Huchet et al. | 100/76 |

FOREIGN PATENT DOCUMENTS

| | | |
|---|---|---|
| DE | 3327042 A1 | 2/1985 |
| EP | 0289091 A1 | 11/1988 |

* cited by examiner

Primary Examiner—Rinaldi I. Rada
Assistant Examiner—Hemant M. Desai
(74) Attorney, Agent, or Firm—John William Stader; Collin A. Webb; Rebecca L. Henkel

(57) ABSTRACT

An adjustable force wrapping material brake mechanism and dispenser assembly for an agricultural baler. The assembly includes a wrapping material dispenser roll mount rotatably supporting a wrapping material dispenser roll. A brake-biasing arm is provided having a first end fixedly connected to a first end of a rotatable shaft. A tension arm is connected to the second end of the shaft, and bears a counter roller disposed to roll on a surface of the material dispenser roll. A pivotable monolithic brake lever arm is provided with a brake pad. A single tension spring connects the brake biasing arm and the brake lever arm to bias the brake pad to contact the brake drum with a biasing force, and thereby braking the dispenser roll. As wrapping material is dispensed, the tension arm and brake biasing arm rotate to reduce the biasing force of the spring.

12 Claims, 6 Drawing Sheets

ADJUSTABLE FORCE NET BRAKE MECHANISM AND WRAPPING MATERIAL DISPENSING ASSEMBLY

FIELD OF THE INVENTION

This invention relates to round balers that include a bale wrapping apparatus for wrapping a harvested crop material with a wrapping material, such as a net or twine, to produce geometrically-shaped bales of the harvested crop material for convenient transport and storage. More particularly, the present invention relates to a round baler with bale wrapping apparatus, wherein the round baler also includes an adjustable force wrapping material brake mechanism which compensates for the increase in the force required to pull wrapping material off of a material dispenser roll as the diameter of the material roll decreases. In particular, the force applied by the wrapping material brake mechanism decreases as the diameter of the wrapping material roll decreases, all to counteract the increased force required to pull material off of the roll as the roll diameter decreases, thereby maintaining relatively constant, the force required to dispense wrapping material throughout the dispensing of the dispensing roll. In a preferred embodiment, the operator can be made aware of the impending need to provide more wrapping material for the bale wrapping apparatus.

BACKGROUND OF THE INVENTION

Balers often use netting, twine, plastic films, or other wrapping materials to wrap, and thereby confine and protect bales of forage immediately after bale formation while the bales are still within the baler. In particular, conventional balers typically incorporate wrapping material dispensers comprising a dispenser roll, which must be unwound from the roll before it is fed onto the newly formed bales. Thus, the provision of wrapping material is frequently achieved by unwinding such materials from pre-wrapped rolls mounted within the baler itself. Used as such, material on a pre-wrapped roll is drawn off of the roll in a constant stream and likewise fed into an automated wrapping assembly to be wrapped around the exterior portion of the bale. This drawing requires a pulling force to unwind the material.

One important aspect of this process is to ensure a tight and even supply of material by applying an opposing drag force to the dispenser roll as the constant stream of material is unwound. This provides a constant tension in the material that prevents bunching, recoil, entanglement, or overlap of the wrapping material.

Another important aspect of this process is the consistency of the wrapping from bale to bale, in terms of the rate of supply of, and thus the amount of, wrapping material used. This consistency is determined in part by the varying amount of force required to unwind the dispenser roll as the roll becomes smaller, in order to assure that a constant amount of material is dispensed. A newer roll, which is nearly full of material, has a wide diameter and as a result requires less force to unwind than an older roll, which is nearly empty. This force gradually decreases from bale to bale over the dispensing lifetime of each wrapping material roll. Thus, as wrapping material is depleted and the diameter of each roll decreases, the force required for unwinding the same amount of material at the same rate decreases. This change in required pulling force in turn, tends to promote inconsistent wrapping, from bale to bale, over the course of each dispenser roll's lifetime. Therefore, a braking system a braking system is required to regulate or counteracts this tendency towards inconsistent bale wrapping.

U.S. Pat. No. 6,164,050 ("the '050 patent") teaches such a dispenser roll braking system that varies the force by which the brake shoe is loaded against a friction disk connected to a dispenser roll in accordance with the actual amount of wrapping material remaining on the dispenser roll as determined by the diameter of the dispenser roll. As can be seen from FIG. 4, however, the '050 patent teaches the use of a two-spring system, which biases the brake biasing arm 124 both vertically (131) and horizontally (126). In particular, the vertically biasing assembly includes a rod 129 pivotally attached to the upper end of the brake biasing arm 124. This rod 129 is used with a compression spring 131 mounted over the rod 129 to exert a force on the upper end of the brake biasing arm 124. It has been found however, that despite such teaching, a vertically biasing spring is unnecessarily complex and is therefore more likely to malfunction because it incorporates multiple spring assemblies.

Similarly problematic is the two-piece braking assembly comprising a load arm 119 and drag lever 117 both taught by the '050 patent. Such a system is unnecessarily complicated and is prone to malfunction because it requires multiple parts.

The '050 patent also requires that the stream of dispensed material be drawn from the bottom of the dispenser supply roll 88 and around idler roll 89 before it is fed into the bale forming chamber 16. This design requires the use of extra space that could other wise be used to house other electrical or mechanical assemblies and/or components. Thus, the '050 patent's requirement of additional assemblies and parts is unnecessarily complicated and bulky for its use within the confines of its baler housing.

Hence there exists a need for an improved adjustable brake mechanism and material dispensing assembly for varying the force by which a brake drags a dispenser roll in accordance with the actual amount of wrapping material remaining on the dispenser roll as determined by the diameter of the dispenser roll. In particular, there is a need for a brake mechanism and material dispensing assembly that uses fewer parts to minimize the chance of malfunction, and is more compact to allow for the placement of other not directly related components and assemblies.

Accordingly, an object of the present invention is to overcome the limitations of the prior art balers having adjustable brake mechanisms and material dispensing assemblies that use excessive parts, which heightens the chance of mechanical malfunction.

Another object of the present invention is to provide a baler having an adjustable brake mechanism that is more compact to allow for the placement of other not directly related components and assemblies.

SUMMARY OF THE INVENTION

In accordance with the above objects and other objects, which will be readily apparent to one having skill in the art, the present invention an adjustable force wrapping material brake mechanism and dispenser assembly for an agricultural baler. The assembly includes a wrapping material dispenser roll mount rotatably supporting a wrapping material dispenser roll and having a first longitudinal axis. A rotatable shaft is provided having a first end, a second end, and a second longitudinal axis substantially parallel to the first longitudinal axis. A brake biasing arm is provided having a first end fixedly connected to the first end of the rotatable shaft. A tension arm is provided having a first end fixedly connected to the second end of the shaft, and a second end bearing a counter roller disposed to roll on a surface of the material dispenser roll rotatably supported on the wrapping material dispenser roll mount. The tension arm has a first position corresponding to a substantially full wrapping material roll, and a second position corresponding to a substantially empty wrapping material roll. A brake drum is disposed to roll with the wrapping material dispenser roll. A pivotable monolithic brake lever arm is provided with a brake pad connected to one end. The brake lever arm is pivotable towards the brake drum causing the brake pad to contact the drum and thereby brake the dispenser roll. A tension spring connects the second end of the brake biasing arm and the other end of the brake lever arm to bias the brake pad to contact the brake drum with a biasing force, and thereby braking the dispenser roll. According to the invention, as wrapping material is dispensed and the counter roller moves from the first position to the second position, the tension arm rotates about the second longitudinal axis, thereby rotating the brake biasing arm about the second longitudinal axis to reduce the biasing force of the spring.

According to one preferred embodiment of the invention, the dispenser roll has a top and the material is fed from the top.

According to a further embodiment, the tension spring is the only spring biasing the brake biasing arm.

According to yet another embodiment of the invention, the brake mechanism further comprises a low wrapping material indication switch for providing an indication signal when the tension arm is in a position at or approaching the second position.

According to a still further embodiment of the invention, said wrapping material is netting, twine, or plastic film.

According to yet another embodiment of the invention, the counter roller extends from a position past a width of the wrapping material dispenser roll, and the wrapping material passes the tension arm over the top of the dispenser roll.

According to a still further embodiment of the invention, the assembly further comprises an actuator assembly for delivering wrapping material to a bale and movable from a first retracted position to a second extended position delivering wrapping material to the bale, wherein, when the actuator assembly is in the second position, the pivotable, monolithic brake lever arm is pivoted so that the brake pad does not contact the brake drum.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS

Figure 1:
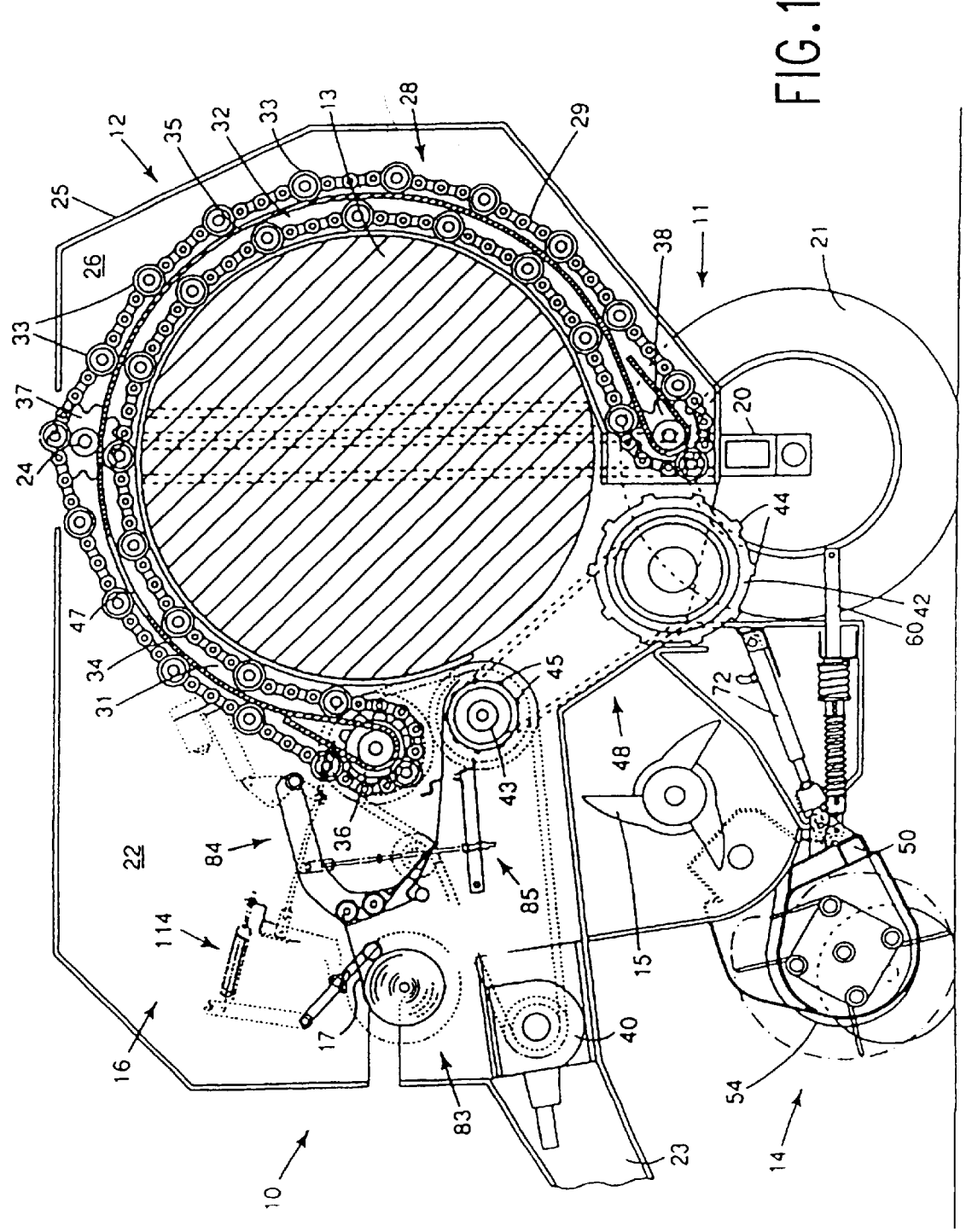
FIG. 1 is an agricultural harvester in accordance with a preferred embodiment of the present invention.

The preferred embodiments of the invention will now be described with reference to the Figures in which like parts are indicated by like reference numerals. The apparatus of the present invention as shown in FIG. 1 is a round baler 10 including a main frame or housing 11 and a bale forming chamber 12 mounted onto or inside of housing/frame 11, wherein the bale forming chamber is illustrated as a fixed bale forming chamber for forming a geometrical package 13 of crop material known as a "bale." Preferably, the bale produced has a cylindrical shape; however, one skilled in the art would appreciate that the present invention can be practiced on balers that produce rectangular bales and can be practiced by round balers having a variable bale-forming chamber. A description of a further baler to which the present invention can be applied can be found in U.S. Pat. No. 6,164,050, hereby incorporated by reference in its entirety.

Main frame 11 includes a main support beam 20 on which a pair of wheels 21 (only one shown) is rotatably affixed. A tongue 23 extends from a front portion of frame 11 to provide a conventional hitch connection for connecting to a tractor or other work vehicle. Frame 11 also includes a pair of sidewalls 22 (only one shown) between which the bale-forming chamber 12 extends. A pair of stub shafts 24 (only one shown) pivotally connect tailgate 25, which pivotally rotates about the stub shafts 24 from the closed position shown in FIG. 1 to an open position as is conventionally known so that a completed wrapped bale can be discharged to the ground. Tailgate 25 includes a pair of tailgate sidewalls 26 (only one shown) that are coextensive with sidewalls 22.

Baler 10 also includes a pick-up assembly 14 for picking up a cut crop material, such as straw, hay, and the like, from a field and delivering it to a rotatable conveyer 15, which feeds the cut crop material into the bale forming chamber 12 while the baler moves across a field. The pick-up assembly operates in a conventionally-known manner. A bale wrapping apparatus 16 disposed within housing/frame 11 so as to be near the bale forming chamber 12 serves to wrap wrapping material 17, such as net, twine or plastic sheet, around the bale 13 within the bale forming chamber.

The bale-forming chamber 12 is defined primarily by an apron assembly 28 for moving the cut crop material about the bale-forming chamber 12 and into a bale, wherein the apron assembly includes a pair of support chains 29. Chains 29 are mounted to travel along a continuous path, the inner run of which is defined on sidewalls 22 and tailgate sidewalls 26 by front and rear sections 31, 32 of a continuous chain guide track that separates during bale discharge. Apron assembly 28 also includes a plurality of tubular parallel crop-engaging slats 33 extending between the chains 29 to provide a cage-like periphery for the bale-forming chamber 12. Rear sections 34, 35 of a continuous cylindrical bale chamber wall provide an inner run for the apron assembly 28. Rear sections 34, 35 are also separable during bale discharge and are mounted between sidewalls 22 and tailgate sidewalls 26.

Drive sprockets 36 mounted between sidewalls 22, idler sprockets 37 mounted between sidewalls 22 on stub shafts 24, and idler sprockets 38 operatively engage chains 29 to move the apron assembly 28 by use of a conventional chain drive system (depicted in phantom outline outwardly of sidewall 22) coupled to gearbox 40 as is generally known in the art.

The bale forming chamber 12 is further defined by the outer conveying surfaces of floor roll 42 and stripper roll 43, which are driven by the conventional drive means coupled to gearbox 40 to rotate in a clock-wise direction. Rolls 42, 43 convey crops into the bale-forming chamber 12 as a bale is forming.

The formation of a bale is achieved in the conventional manner wherein the pick-up assembly 14 picks up cut crop material from a field and delivers the material to conveyor 15, which in turn delivers the material to the bale chamber inlet 48 defined by floor roll 42 and stripper roll 43. The slats 33 of the apron assembly 28 subsequently engage and rotate the cut crop material thereby moving the cut crop material about the bale-forming chamber 12 to form the bale 13 as described in U.S. Pat. No. 6,164,050.

Figure 2:
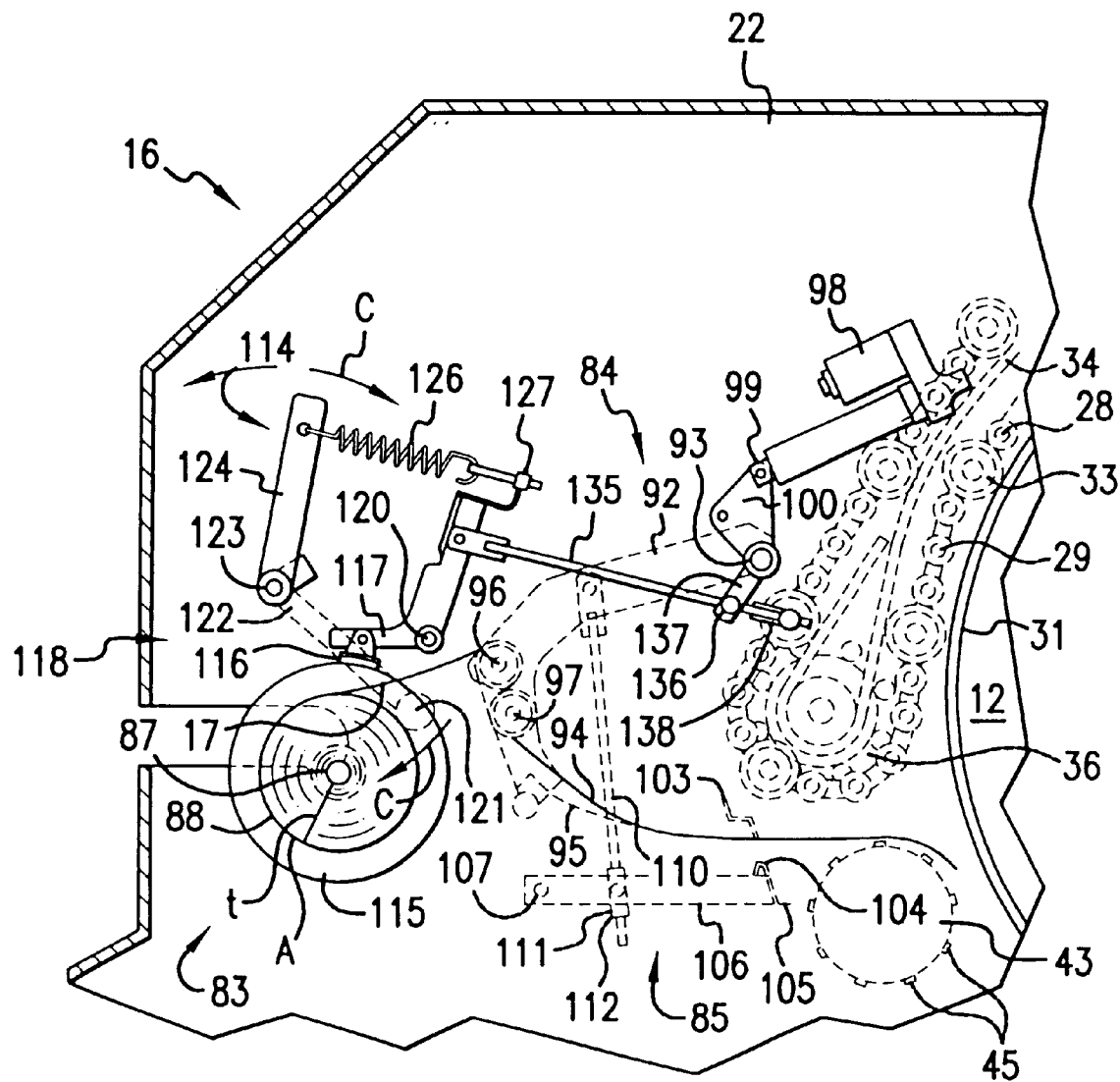
FIG. 2 is a schematic drawing of an adjustable force wrapping material brake mechanism and dispenser assembly supporting a nearly full material roll in accordance with a preferred embodiment of the present invention.
Figure 3:
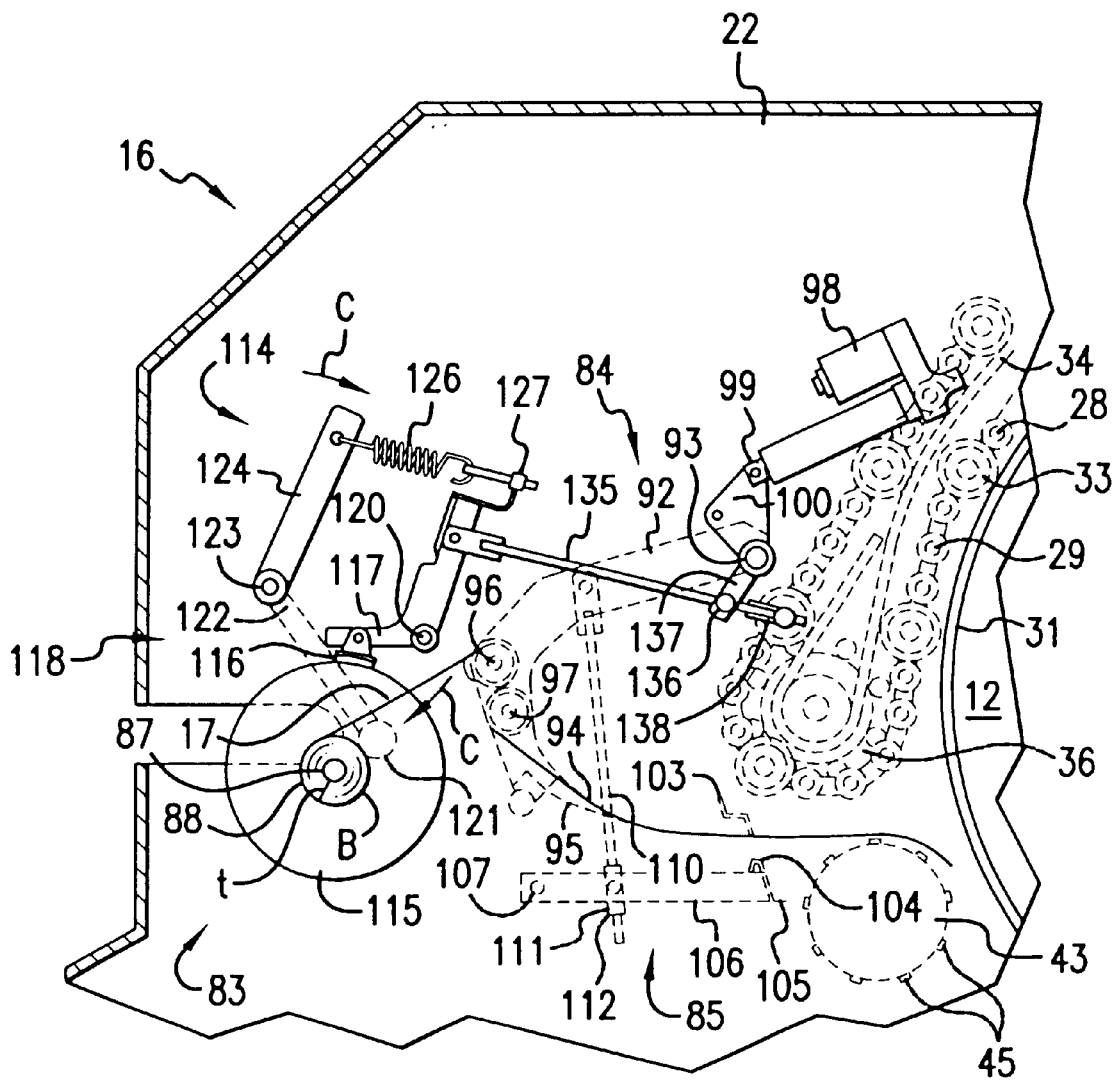
FIG. 3 is a schematic drawing of an adjustable force wrapping material brake mechanism and dispenser assembly supporting a nearly empty material roll in accordance with a preferred embodiment of the present invention.

Once the bale 13 has been formed, the wrapping apparatus 16 shown in FIGS. 1, 2 and 3 is employed to wrap a wrapping material 17 around the bale to produce a completed wrapped bale that is ready for discharge from the baler 10. FIG. 2 shows the wrapping apparatus 16 during a wrapping cycle. Wrapping apparatus 16 includes a wrapping material supply assembly 83, a dispensing mechanism 84 that receives wrapping material 17 from the supply assembly and dispenses it to the bale forming chamber 12, and severing assembly 85 for severing the wrapping material after it has been wound around the bale 13.

As shown in FIGS. 2 and 3, the dispensing mechanism 84 comprises a pair of parallel frame members 92 fixedly secured to a rotatably supported cross tube 93 which extends between the side walls 22, and an upper and a lower clamping member 94, 95, both of which have tips for grasping the net material 17 in a fashion which is clearly described in U.S. Pat. No. 4,956,968. Two spreader rolls 96, 97, provided with appropriate surface elements, such as spirals, for spreading the side strips of the dispensed net 17, extend between the frame members 92. The net 17 issued from the supply roll 88 is guided along a path around the spreader rolls 96, 97 to the clamping members 94, 95.

Mounted outboard of the side wall 22 is an electrical actuator assembly 98 comprising means for reciprocally driving an element 99 which is pivotally attached to one end of a link member 100. The other end of this link member 100 is fixedly secured to an outboard end of the cross tube 93. Extension and retraction of the actuator element 99 pivot the frame members 92 rearwardly and forwardly to deliver the net 17 to a gap between the exit of the apron assembly 28 and the stripper roll 43.

The net severing assembly 85 comprises a shear bar 103 fixedly mounted between the side walls 22 and a transverse knife 104 affixed to a mounting member 105 extending between a pair of parallel knife support arms 106 which are rotatably mounted at fixed pivot points 107 on the inside of the side walls 22. A coupling link 110 is pivotally attached at its upper end to one of the frame members 92. Its lower end is received in a sliding bushing 111, which is pivotally attached to one of the knife support arms 106. The lower portion of the coupling link 110 is provided with a stop nut 112 for adjusting the position of the knife 104 to the shear bar 103 when the frame members 92 are pivoted to their uppermost position, slightly above the position shown in FIGS. 2 and 3.

In accordance with a preferred embodiment of the present invention, wrapping material dispensing assembly 83 includes a support roll mount 87, which is preferably a steel shaft, rotatably mounted on pivot plate 89 (shown in FIG. 4) mounted on sidewall 22 so that roll mount 87 may rotate when a supply roll 88 having wrapping material 17 stored thereon is mounted onto roll mount 87 and is secured thereto with barbs or a pair of cones. Preferably, wrapping material 17 is a bale wrapping net material; however, plastic sheet material or twine can also be used. As shown in FIG. 2, wrapping material 17 is guided directly from the supply roll 88 to the dispensing mechanism 84, without the use of an idler roll(s) under the roll 88 for upwardly redirecting the material 17. This is accomplished by drawing the material 17 over, and from the top of, the dispenser roll 88. To ensure that tension arm 122 does not interfere with either side of material 17, arm 122 is positioned outside of the width of roll 88 so as to allow such flow from the top of the dispenser roll 88. As a result, counter roller 121 extends inwardly of the lower end of arm 122 so that it may contact and ride upon roll 88 (See FIG. 4). Such an extension from the tension arm 122 to the roll 88 allows the wrapping material 17 to pass over the top of the dispenser roll completely unobstructed by the arm 122. Counter roller 121 thus eliminates the need for idle rollers apart from those in dispensing mechanism 84. In particular, this configuration frees much of the space under, and rearwardly disposed of, roll assembly 83 for other not immediately and directly related assemblies and/or components such as electrical components, gear assemblies and a great number of other components and assemblies readily apparent to those having skill in the art.

Wrapping apparatus 16 further comprises a wrapping material brake mechanism 114 for maintaining the wrapping material stretched between the net supply assembly 83 and the bale-forming chamber 12. Brake mechanism 114 includes a steel friction disc or brake drum 115 secured to an outer end of roll mount 87 so that the periphery of disc 115 engages a brake shoe 116 provided with a lining of friction material. Brake shoe 116 is affixed to a single-piece, monolithic brake lever arm 117 that is pivotally attached to an internal support member 119 (seen in FIG. 4 with frame not shown) by stud 120. The substantially horizontally disposed end of brake lever arm 117 can be pushed forward by its substantially vertically disposed end that is connected to the driving means 99 of electrical actuator assembly 98 via release rod 135 connected to release arm 137. Release arm 137 is affixed to cross tube 93, which is fixedly secured to one end of link member 100. Another end of link member 100 is pivotally attached to driving means 99. The activation of the electrical actuator assembly 98 to initiate a wrapping operation after the formation of the bale in the bale forming chamber 12 is electronically controlled by a deliberate or automatic signal as described in U.S. Pat. No. 5,687,548 to McClure et al. and U.S. Pat. No. 5,692,365 to Meyer et al., both of which are incorporated herein by reference in their entirety.

As distinct from multiple-piece lever arms, forward movement of the vertically disposed end of the single-piece lever arm 117 necessarily affects a braking engagement of the brake shoe 116 with disc 115 whereas rearward movement of vertically disposed end of lever arm 117 disengages the brake shoe from the friction disc 115, thereby allowing supply roll 88 to rotate and issue wrapping material 17 therefrom. Such single piece lever movement diminishes the production cost and maintenance required by multiple-piece lever brake arms. Spring 126 ensures that the upper portion of lever arm 117 is biased towards the forward, braking position.

In a preferred embodiment, the brake mechanism 114 also includes a supply roll diameter sensing assembly 118 that includes a transverse and inwardly extended counter roller 121 disposed at the end of a rearwardly and downwardly extending tension arm 122 so that counter roller 121 engages the periphery of the net supply roll 88 as mentioned, supra. Tension arm 122 is attached to an outer end of a pivot shaft 123 extending through sidewall 22. Brake biasing arm 124 is fixedly attached to the outer end of shaft 123 and tension spring 126 is connected between biasing arm 124 and the vertically disposed end of brake lever arm 117 so as to bias the brake shoe 116 to frictionally engage disc 115.

The diameter of the supply roll 88 is sensed by counter roller 121 on tension arm 122. Counter roller 121 is forced against and rides along the roll surface by tension spring 126. The roll diameter defines the position of brake biasing arm 124 and hence the extension of tension spring 126. The force of spring 126 is transferred upon the vertically disposed end and, thus the horizontal end of brake lever arm 117, which pushes the brake shoe 116 against friction disc 115.

One skilled in the art would appreciate that a full supply roll 88 generates maximum spring extension and consequently a maximum braking force for the rotation of roll mount 87. As the roll diameter decreases during wrapping operations, spring 126 contracts as shown in FIG. 3 and the braking force on the periphery of friction disc 115 decreases proportionally. Thus, the wrapping apparatus 16 is provided with a mechanism for maintaining a substantially constant stretching force or tension on the wrapping material 17 during all wrapping operations.

From FIGS. 2 and 3, it is evident that as the wrapping material is dispensed from supply roll 88 the diameter of the supply roll gradually decreases and the position of tension arm 122 changes. FIG. 2 illustrates brake mechanism 114 and its relationship to supply roll 88 changes as the roll goes from being half-loaded to being nearly completely depleted. For example, FIGS. 2 and 3 illustrate brake mechanism 114 and its relationship to supply roll 88 as the roll goes from being nearly fully loaded with wrapping material 17 to being nearly depleted. In FIG. 2, the roll has a thickness T and providing an outer surface A. In FIG. 3, the roll is almost spent of wrapping material 17 having a thickness t and provides an outer surface B (shown in outline). See also FIG. 5. When the roll 88 is fully loaded (not shown), the tension arm 122, counter roller 121 and brake biasing arm 124 are said to be in a "first position." When the roll 88 reaches an almost depleted state corresponding to the remaining wrapping material having a thickness t, tension arm 122, counter roller 121 and brake biasing arm 124 are said to be in a "second position" shown in outline in FIG. 3. Correspondingly, as tension arm 122 and counter roller 121 move from the first position to the second position, the tension arm 122 and the biasing arm 124 move along arc C.

Figure 5:
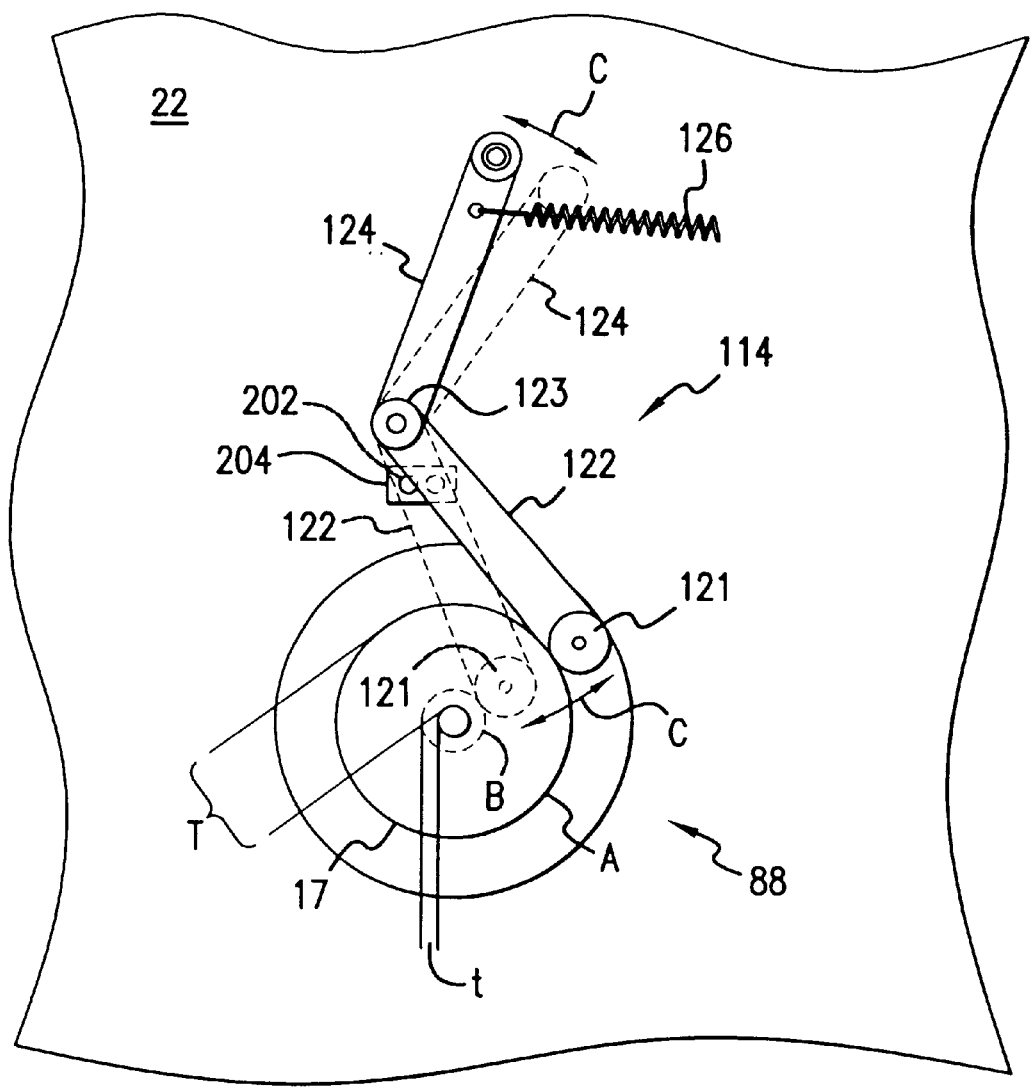
FIG. 5 is a schematic drawing of an adjustable force wrapping material brake mechanism and dispenser assembly with a sensor in accordance with a preferred embodiment of the present invention.

In a preferred embodiment, this movement can be detected by an automatic sensor, which is described as follows. As shown in FIG. 5, the baler 10 includes a low wrapping material indication system 200 comprising position sensor 202 disposed on sidewall 22 near to, or in the proximity of, tension arm 122 or alternatively biasing arm 122 (not shown), so that sensor 202 is activated and generates a signal when respective tension arm 122 or biasing arm 124 (not shown) reaches the second position.

Figure 4:
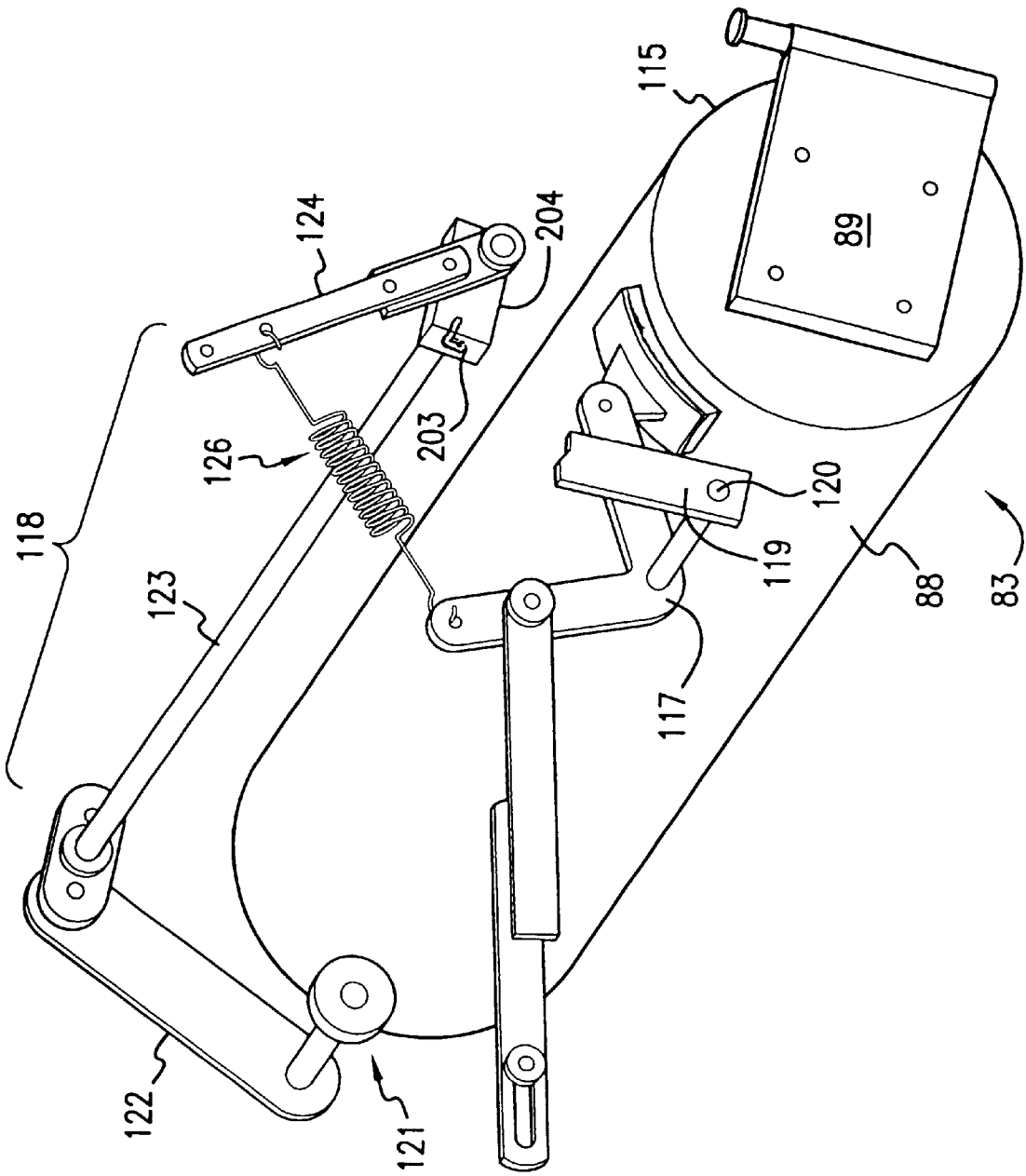
FIG. 4 is a perspective drawing of an adjustable force wrapping material brake mechanism and dispenser assembly supporting a half full material roll in accordance with a preferred embodiment of the present invention.

In an alternate preferred embodiment and as shown in FIG. 4, a mechanical, preferably toggle, switch 203 is used to designate low wrapping material by completing an electrical circuit having a light (not shown) or other indicator, in lieu of sensor 202. Such switch 203 and its housing 204 are pivotally disposed on shaft 123 inwardly of arm 124 and are held stationary with respect to the movement of the roll diameter sensing assembly 118 by rigid attachment (not shown), for example, to frame member 119 for mechanical engagement as a result of movement of either biasing arm 124 or tension arm 122 (set up for tension arm not shown). In yet another alternate preferred embodiment, of course, a sensor, such as sensor 202, is mounted in a likewise fashion as toggle switch 203 to report to a display assembly 210, such as the one shown in FIG. 6.

Figure 6:
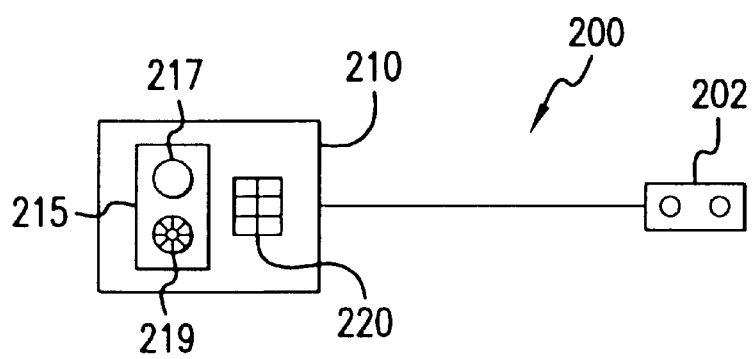
FIG. 6 is a schematic drawing of a sensor and display assembly in accordance with a preferred embodiment of the present invention.

Nevertheless, with regard to the sensor display mechanism and as shown in FIG. 6, sensor 202 is electronically connected to a display assembly 210 located on the baler 10, such as on an external portion of frame/housing 11, so that an operator can sense a warning indicator 215. Display assembly 210 is an electronic device having an internal adjustable controller.

With regard to the sensing mechanism itself, preferably, sensor 200 is an elongated magnetic sensor that senses a metal portion of tension arm 122. Sensor 200 is preferably mounted in a slot 204 formed in sidewall 22 and proximate to shaft 123 and positioned so that the sensor will generate a signal when the tension arm 122 is at or near the second position. Warning indicator 215 is preferably some form of visual device 217, such as a light or an LED; however, audio devices 219 such as a horn, a bell, or other audio warning device can be used as the warning indicator 215. In addition, the warning indicator 215 could be practiced as a visual device 217 simultaneously activated in combination with an audio device 219; each of these embodiments providing wrapping material supply information to the operator. Thus, when tension arm 122 reaches the second position, corresponding to the supply roll 88 having only a thickness t of wrapping material 17 remaining, sensor 202 generates a signal that is transmitted to display assembly 210 so that a warning indicator 215 produces a warning signal, being either visual, audio, or a combination of visual and auditory stimuli, that can be appreciated by the operator of the baler 10. Display assembly 210 includes a wrapping material thickness control portion 220 that is electronically configured to adjust and control, in a predetermined and/or programmable manner, the value of thickness t of the remaining wrapping material at which sensor 202 will generate a signal. In this manner, the operator selectively predetermines how much wrapping material is remaining on supply roll 88 when the low wrapping material indication system 200 generates a signal that there is a low amount of wrapping material remaining on the supply roll.

In an alternate preferred embodiment of the present invention, sensor 202 is an elongated potentiometer having linkages connected to tension arm 122 so that the potentiometer continuously senses the diameter of the wrapping material on supply roll 88 directly via the position of tension arm 122. In this manner, tension arm 122 can continuously provide display assembly 210 with data signals indicating the diameter of the wrapping material on supply roll 88 by continuously sensing the position of tension arm 122. The controller (i.e. computer or electronic calculating device) of display assembly 210 continuously monitors the signal from the potentiometer to calculate and display wrapping material supply information on a gauge or bar graph display that serves as the visual device 217.

The operation of the braking mechanism in connection with the dispensing mechanism 84 in a preferred embodiment is described as follows. As stated, FIG. 2 illustrates the operation of the wrapping apparatus 16 when the wrapping material roll is half full. The net 17 is unwound from the supply roll 88 and is guided along the spreader rolls 96, 97 and the clamping members 94, 95 to the bale forming chamber 12 where it has been grasped by the rotating cylindrical bale 13 (See FIG. 1). During this stage the actuator 98 has not been fully retracted such that the support arm 106 of the net severing assembly 85 has not reached its uppermost position and there remains a gap between the shear bar 103 and the knife 104 for feeding the net 17 between.

On the one hand it is required that the net surface is pulled with sufficient force against the spreader rolls 96, 97 for effective spreading of the material unrolled from the supply roll 88, and on the other hand this force has to be limited to prevent shearing of this material. As the resistance against unwinding grows as the supply roll diameter diminishes and the roll 88 is rotated more rapidly, the drag force exerted by the brake shoe 116 has to be adapted to accordingly. This effect is generated by the braking mechanism 114.

The diameter of the supply roll 88 is measured by the tension arm 122, which is forced against the roll surface by the tension spring 126. The roll diameter defines the position of the biasing arm 124 and hence the extension of the tension spring 126. At this stage, as during operation of the braking mechanism over the entire dispensing cycle, the only force for holding this member 121 against the roll surface results from the tension spring 126, which has partially retracted in accordance with the roll diameter. The force from this spring is transferred upon lever arm 117, which pivots to push the brake shoe 116 against the friction disc 115.

A full supply roll 88 (not shown) will generate maximum spring extension and hence maximum braking force for the rotation of the roll shaft 87. While the roll diameter decreases gradually during wrapping operations, the spring 126 contracts accordingly and the braking force on the periphery of the friction disc 115 decreases proportionally. Thus are provided means for maintaining the net 17 stretched with a substantially constant force during all wrapping operations.

When the roll 88 is almost completely unwound, as shown in FIG. 3, the biasing arm 124 has reached its rearmost position. At this stage, as during operation of the braking mechanism over the entire dispensing cycle, the only force for holding this member 121 against the roll surface results from the tension spring 126, which has substantially retracted in accordance with the roll diameter.

Figure 7:
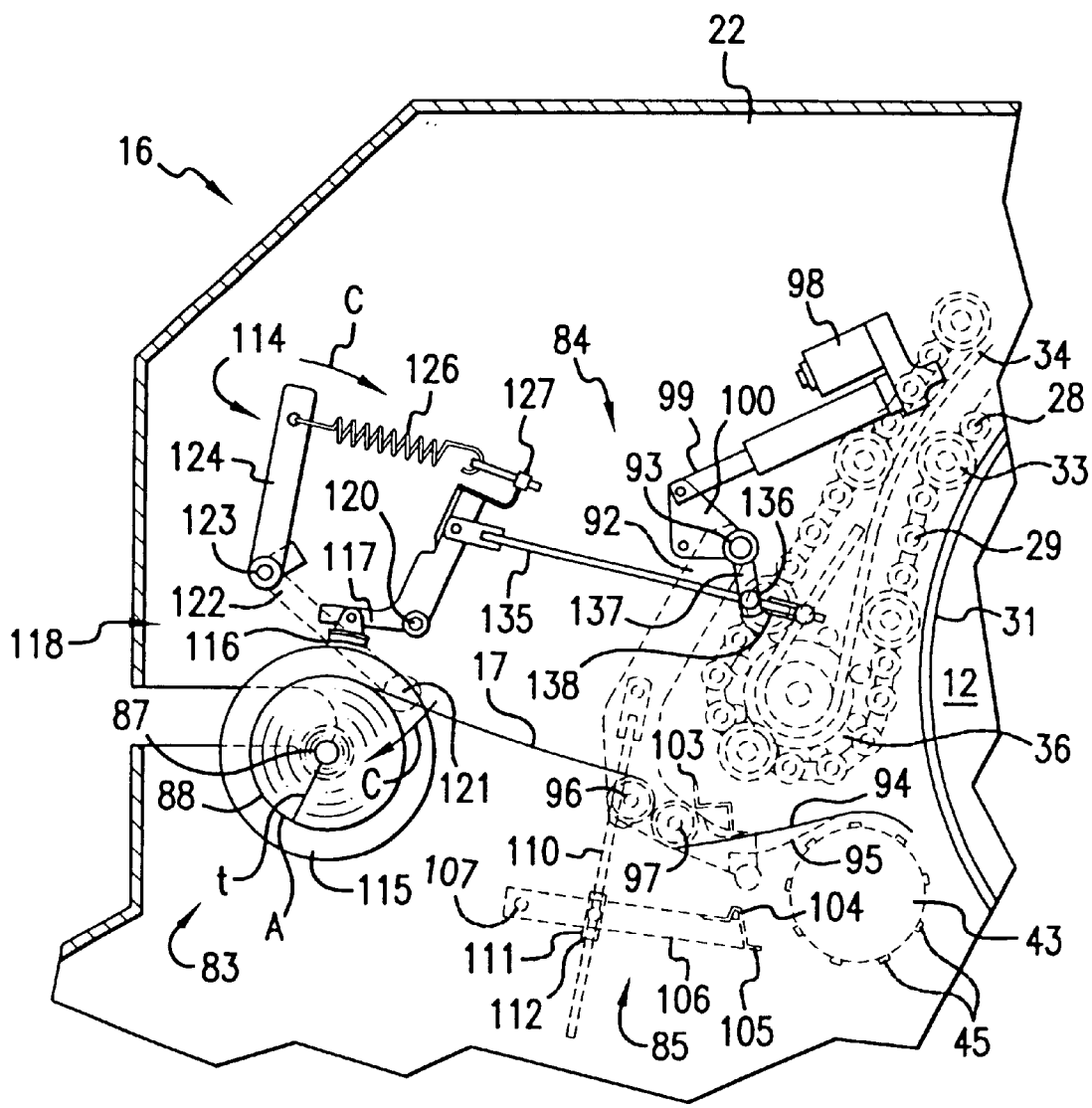
FIG. 7 is a schematic drawing of an adjustable force wrapping material brake mechanism and dispenser assembly supporting a half full material roll wherein the dispensing mechanism is in a retracted position in accordance with a preferred embodiment of the present invention.

FIG. 7 illustrates the wrapping apparatus 16 at the start of a wrapping operation. Between wrapping operations the net dispensing mechanism 84 is retracted in a position slightly above the position shown in FIGS. 2 and 3. The net 17 has been severed by the severing assembly 85 and a net tail is extending between the clamping members 95, 96 and the knife 104 while a compacted cylindrical package is being formed in the chamber 12. At the start of a new wrapping operation the actuator 98 is energized to pivot the frame members 92 rearwardly and to lower the knife support arms 106. The net tail is released from the knife 104 and conveyed by the clamping members 94, 95 into the gap between the still rotating apron assembly 28 and stripper roll 43. The ribs 45 on the stripper roll 43 grasp the end of the net 17 and feed it to the nip between this roll 43 and the surface of the cylindrical package of crop material. The net 17 is further unwound from the supply roll 88 by the action of the still rotating roll 43 and bale 13.

During the rearward movement of the frame members 92 the sliding yoke 136 on the release arm 137 engages the stop member 138 and pulls the release rod 135 and the lever arm 117 rearwardly, as described above. The arm 117 pivots, such that this lever is not biased towards the friction disc 115 by any spring. It has surprisingly been found that no drag force is required by the brake shoe 116 to provide the drag required to spread the net 17 by means of the spreader rolls 96, 97. Sufficient such drag exists from the inertia of the roll 88. It has also been surprisingly found that such drag is also small enough to prevent extraction of the net tail from between the clamping members 94, 95 during the rearward movement of the net dispensing mechanism 84.

Prior device of U.S. Pat. No. 6,164,050 ('050 Patent) provides a complicated mechanism comprising a compound brake arm including drag lever 117, and load arm 119, brake release lever 143 and additional biasing springs 141 and 131. This complicated structure was thought to be required according to the '050 Patent so that, when the actuator assembly 98 for delivering the net to the gap between the exit of the apron assembly 28 and the stripper roll 43 was fully extended, bias spring 141 provided some braking force to the drag lever 117. In addition, the brake lever needed to be a complicated, compound assembly made up of drag lever 117 and load arm 119, in order that the brake lever was not lifted from the brake drum when the actuator assembly 98 was extended. Contrary to the teachings of the '050 Patent, the brake lever can surprisingly be made as a monolithic brake lever arm that is lifted from the brake drum when the actuator assembly 98 is extended, without adversely affecting the functioning of the device. Also contrary to the teachings of the '050 Patent, omission of the bias spring 141 in the present invention surprisingly does not lead to undesired effect of "substantial transverse contraction of the net" and its omission in the present invention leads to a significant simplification of the brake mechanism structure, with a corresponding reduction in complexity and cost.

After feeding the net tail to the stripper roll 43, the net dispensing mechanism 84 returns to its position shown in FIGS. 2 and 3. The release arm 137 is pivoted forwardly and the yoke 136 disengages the release rod 135, such that the tension spring 126 can pull the lever arm 117 to provide full pressure upon the brake shoe 116. The drag forces on the net 17 increase accordingly such that the spreader rolls 96, 97 may spread the net effectively over the full width of the bale forming chamber 12 during the remainder of the wrapping operation.

In accordance with the present invention, therefore, it is seen that by the preferred embodiments described herein above, there is provided an adjustable force wrapping material brake mechanism and dispenser assembly for an agricultural baler having a wrapping material dispenser roll mount operably supporting a wrapping material dispenser roll and having a first longitudinal axis; a shaft having a first end, a second end, and a longitudinal axis substantially parallel to the first longitudinal axis; and a brake biasing arm having a first end fixedly connected to the first end of the shaft. In addition, the present invention provides a tension arm having a first end fixedly connected to the second end of the shaft; and a spring connected to the second end of the brake biasing arm and biasing the brake arm to exert a braking force on the dispenser roll. Moreover, the second end of the brake biasing arm has a vertical position held in tension only by a relative motion of the shaft and the spring. Plus, as wrapping material is dispensed and the diameter of said dispenser roll decreases, the brake biasing arm rotates about the longitudinal axis of the shaft, thereby allowing the tension arm to rotate about the longitudinal axis of the shaft under the tension force of the spring.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

I claim:

1. An adjustable force wrapping material brake mechanism and dispenser assembly for an agricultural baler, comprising:
    a wrapping material dispenser roll mount rotatably supporting a wrapping material dispenser roll and having a first longitudinal axis;
    a rotatable shaft having a first end, a second end, and a second longitudinal axis substantially parallel to the first longitudinal axis;
    a brake biasing arm having a first end fixedly connected to the first end of the rotatable shaft;
    a tension arm having a first end fixedly connected to the second end of the shaft, and a second end bearing a counter roller disposed to roll on a surface of the material dispenser roll, wherein the tension arm has a first position corresponding to a substantially full wrapping material roll, and a second position corresponding to a substantially empty wrapping material roll;
    a brake drum disposed to roll with the wrapping material dispenser roll;
    a pivotable monolithic brake lever arm; and
    a brake pad connected to one end of the pivotable monolithic brake lever arm, wherein the brake lever arm is pivotable towards the brake drum causing the brake pad to contact the drum and thereby brake the dispenser roll; and
    a tension spring connecting the second end of the brake biasing arm and the other end of the brake lever arm to bias the brake pad to contact the brake drum with a biasing force, and thereby braking the dispenser roll;
    wherein as wrapping material is dispensed and the counter roller moves from the first position to the second position, the tension arm rotates about the second longitudinal axis, thereby rotating the brake biasing arm about the second longitudinal axis to reduce the biasing force of the spring.

2. The adjustable force wrapping material brake mechanism and dispenser assembly of claim 1 wherein said dispenser roll has a top and said material is fed from the top of the dispenser roll.

3. The adjustable force wrapping material brake mechanism and dispenser assembly of claim 2, wherein said tension spring is the only spring biasing said brake biasing arm.

4. The adjustable force wrapping material brake mechanism and dispenser assembly of claim 3, wherein said brake mechanism further comprises a low wrapping material indication switch for providing an indication signal when the tension arm is in a position at or approaching the second position.

5. The adjustable force wrapping material brake mechanism and dispenser assembly of claim 4, further comprising an actuator assembly for delivering wrapping material to a bale and movable from a first retracted position to a second extended position delivering wrapping material to the bale, wherein when the actuator assembly is in the second position, the pivotable, monolithic brake lever arm is pivoted so that the brake pad does not contact the brake drum.

6. The adjustable force wrapping material brake mechanism and dispenser assembly of claim 3, further comprising an actuator assembly for delivering wrapping material to a bale and movable from a first retracted position to a second extended position delivering wrapping material to the bale, wherein when the actuator assembly is in the second position, the pivotable, monolithic brake lever arm is pivoted so that the brake pad does not contact the brake drum.

7. The adjustable force wrapping material brake mechanism and dispenser assembly of claim 1, wherein said wrapping material is netting, twine, or plastic film.

8. The adjustable force wrapping material brake mechanism and dispenser assembly of claim 7, wherein said wrapping material is netting, twine, or plastic film.

9. The adjustable force wrapping material brake mechanism and dispenser assembly of claim 8, wherein the counter roller extends from a position past a width of the wrapping material dispenser roll, and said wrapping material passes the tension arm over the top of the dispenser roll.

10. The adjustable force wrapping material brake mechanism and dispenser assembly of claim 9, further comprising an actuator assembly for delivering wrapping material to a bale and movable from a first retracted position to a second extended position delivering wrapping material to the bale, wherein when the actuator assembly is in the second position, the pivotable, monolithic brake lever arm is pivoted so that the brake pad does not contact the brake drum.

11. The adjustable force wrapping material brake mechanism and dispenser assembly of claim 1, wherein the counter roller extends from a position past a width of the wrapping material dispenser roll, and said wrapping material passes the tension arm over the top of the dispenser roll.

12. The adjustable force wrapping material brake mechanism and dispenser assembly of claim 1, further comprising an actuator assembly for delivering wrapping material to a bale and movable from a first retracted position to a second extended position delivering wrapping material to the bale, wherein when the actuator assembly is in the second position, the pivotable, monolithic brake lever arm is pivoted so that the brake pad does not contact the brake drum.

* * * * *